Figure 4:
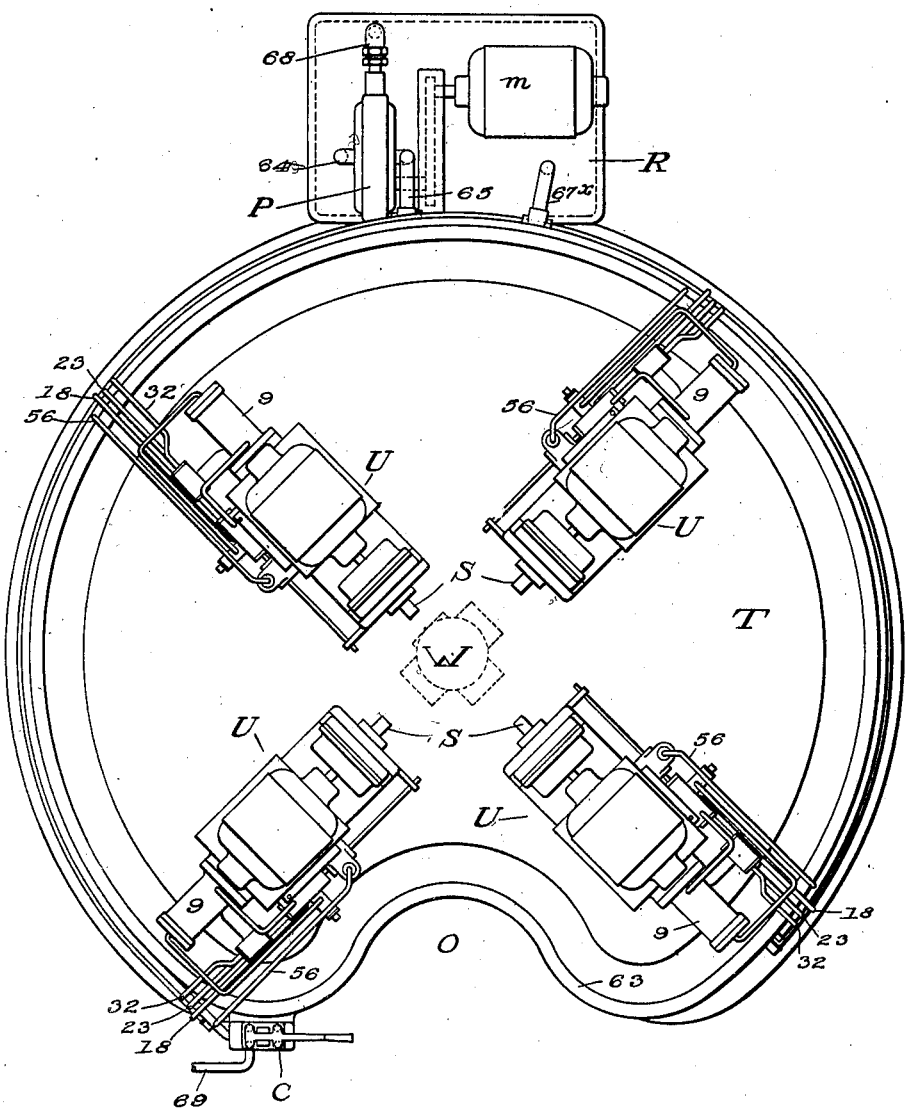

June 17, 1930.   R. M. GALLOWAY   1,764,098
FLUID ACTUATED DRILL UNIT
Filed May 16, 1927   5 Sheets-Sheet 1
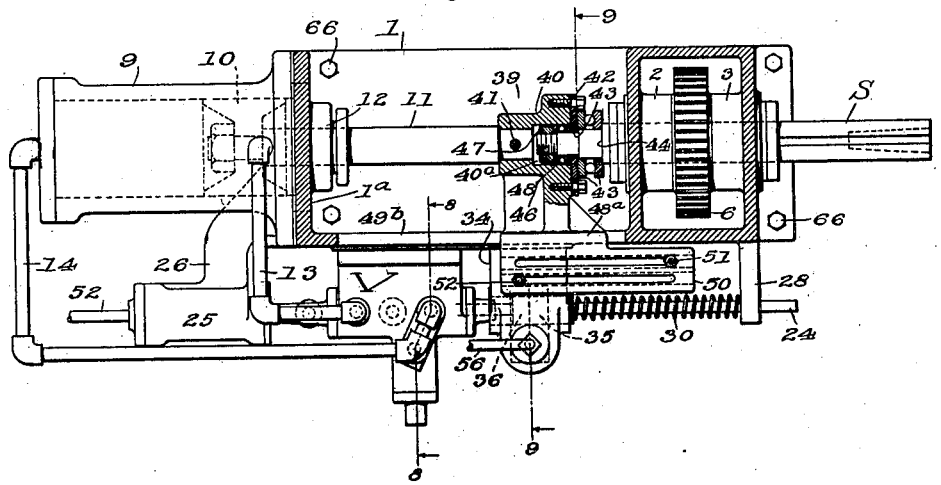
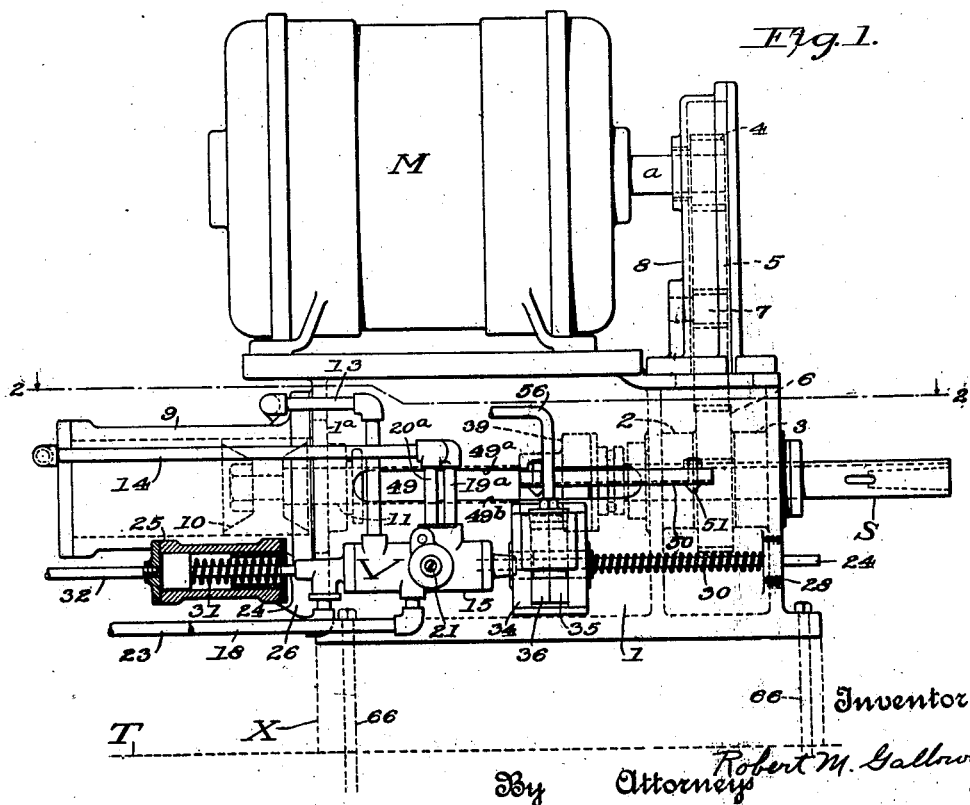

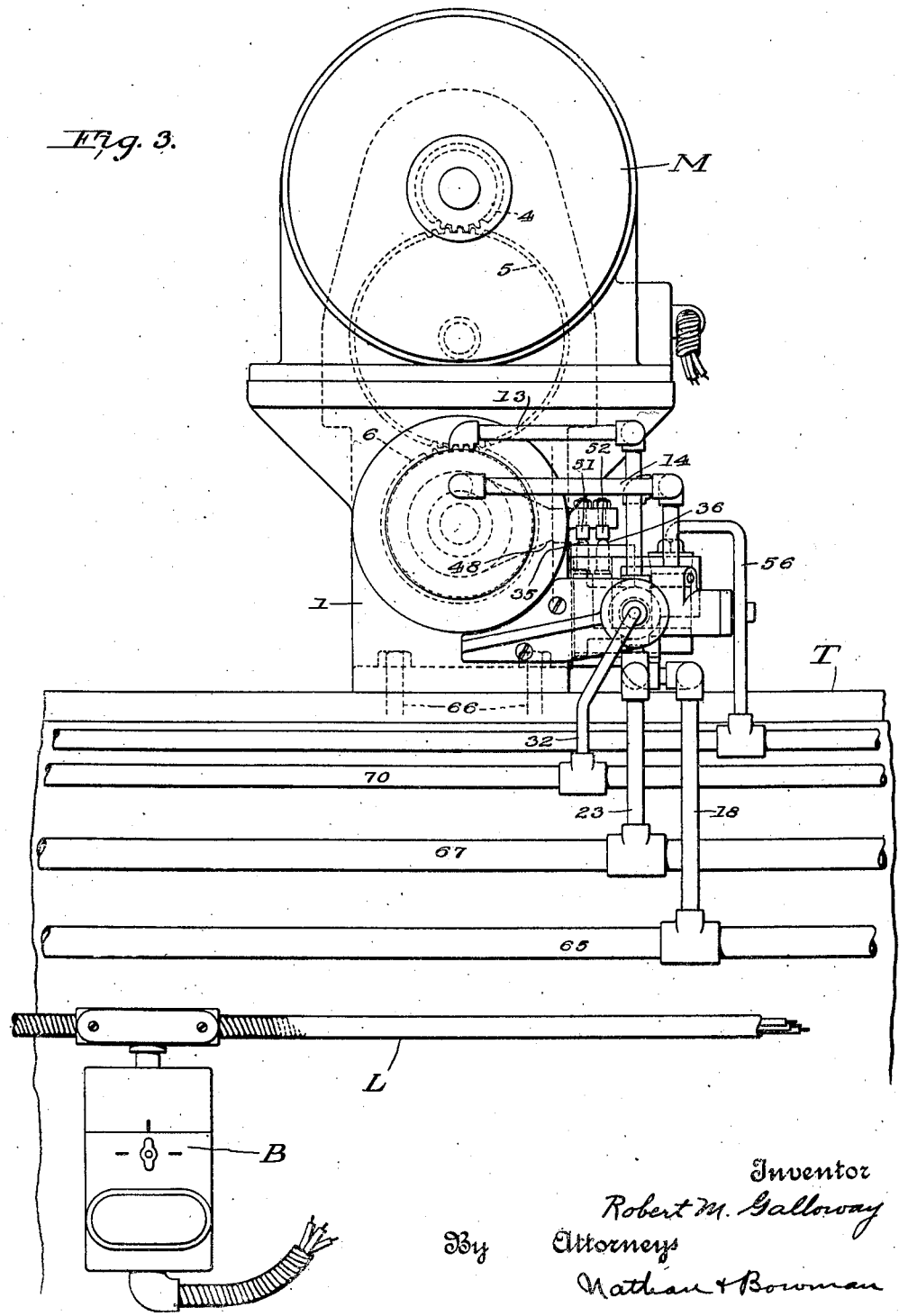

June 17, 1930.  R. M. GALLOWAY  1,764,098
FLUID ACTUATED DRILL UNIT
Filed May 16, 1927  5 Sheets-Sheet 3

Inventor
Robert M. Galloway
By Attorneys
Nathan & Bowman

June 17, 1930.  R. M. GALLOWAY  1,764,098
FLUID ACTUATED DRILL UNIT
Filed May 16, 1927   5 Sheets-Sheet 4
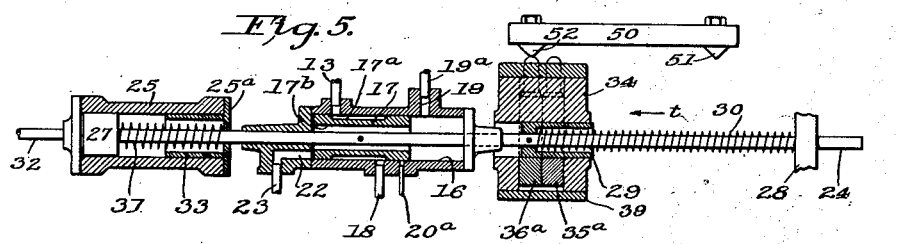
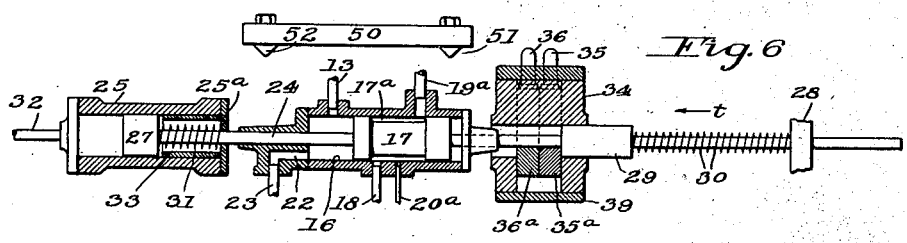
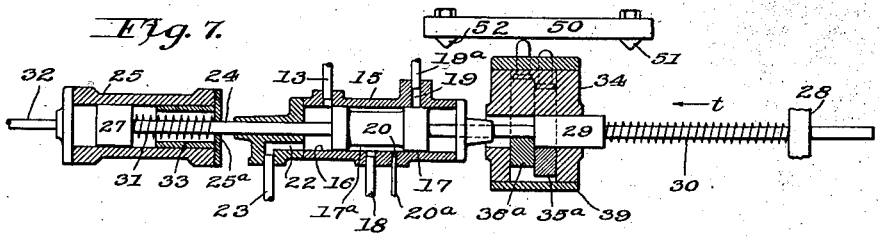
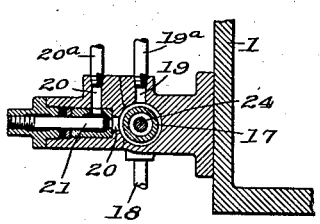
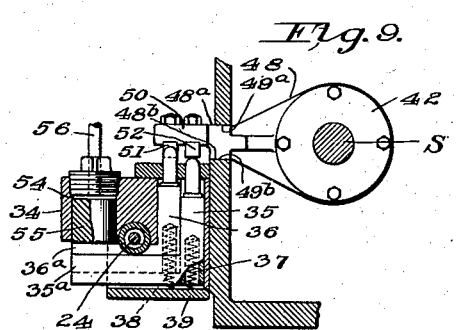
Inventor
Robert M. Galloway
By Attorneys
Nathan & Bowman

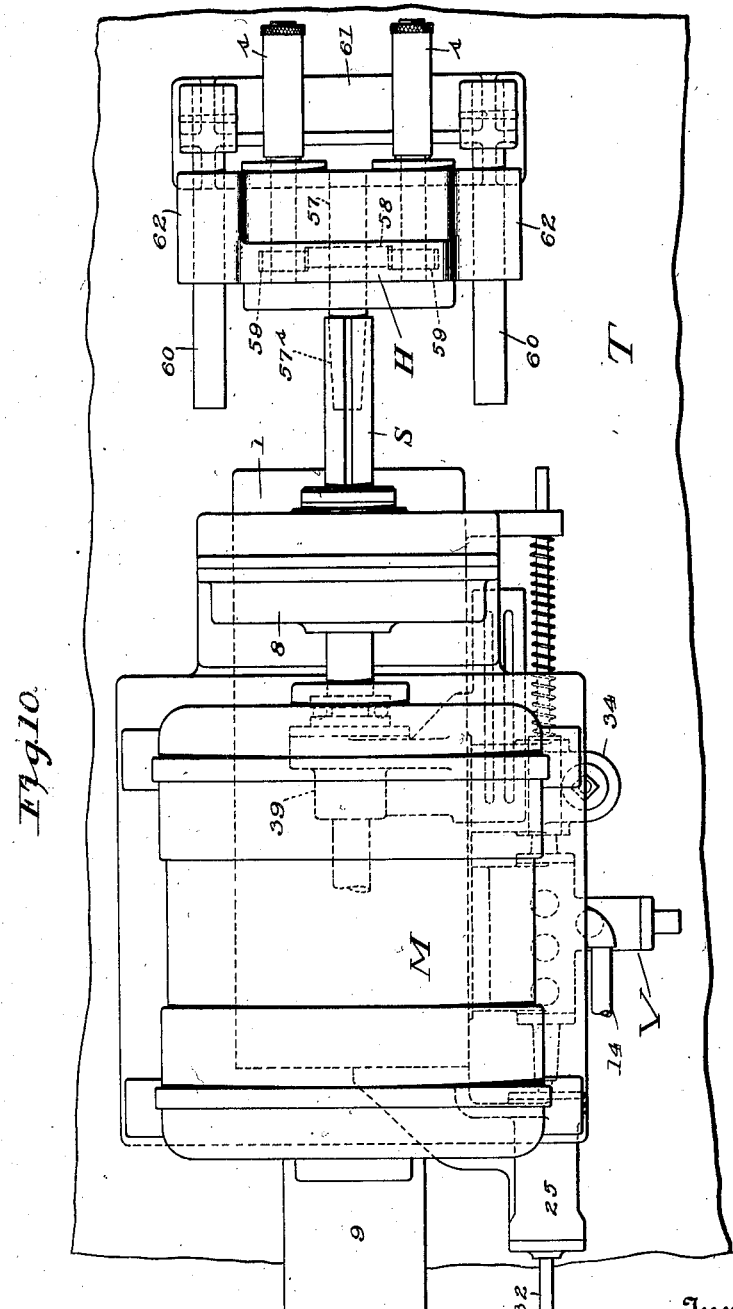

Patented June 17, 1930

1,764,098

UNITED STATES PATENT OFFICE

ROBERT M. GALLOWAY, OF RICHMOND, INDIANA, ASSIGNOR TO THE NATIONAL AUTO-MATIC TOOL COMPANY, OF RICHMOND, INDIANA, A CORPORATION OF INDIANA

FLUID-ACTUATED DRILL UNIT

Application filed May 16, 1927. Serial No. 191,781.

This invention deals with machine tools and it relates more particularly to a self-contained unitary structure adapted to be used either alone to perform simple machining operations, such as the drilling of a single hole (or a plurality of parallel holes) in a work-piece or which may be used in combination with similar units simultaneously to perform more complicated machining operations, such, for example, as the drilling of a plurality of angularly disposed holes in a single work-piece.

Due to the endeavors of machine tool designers and manufacturers to provide automatically actuated machine tools for quantity production and at the same time to meet the demand for so-called "universal" and "multiple" tools which may be used to perform a plurality of operations on a single work-piece, these machine tools have become greatly complicated in construction and consequently very costly to manufacture. The present invention aims to overcome this complicacy of construction and to provide an improved and simplified device well adapted to perform the operations of the more complicated prior constructions.

Heretofore when it was desired to perform certain operations on say three sides of a work piece it was customary either to present the work-piece three successive times to the action of three suitable tools (or sets of tools), or to provide, in a single machine, a suitable frame provided with stationary guideways upon which were translatably mounted three tool-heads each carrying a tool (or a set of tools) adapted, by the translating movement of the head, to be brought into contact with, and to operate on, the work. It will readily be perceived that the former practice is entirely too slow for quantity production and that the latter practice is objectionable in that it requires the provision of a specially formed base providing finely finished fixed guideways which must be accurately located with respect to each other and with respect to the work, and to which more or less complicated heads must be accurately fitted. It will also be perceived that when the guideways for the respective heads have once been formed at a given angle to the guideways for the other heads the angularity of the guideway may not be changed. For example, a machine built originally to drill holes at right angles to each other is not adaptable to the drilling of holes at any other angle, such for instance as at an angle of forty-five degrees. Furthermore, due to the weight of the heads considerable power was required to effect translation thereof.

This invention has for an object to simplify machine tool construction by providing a self-contained unitary structure supporting either one or a plurality of metal cutting tools and embodying all the mechanism required to give the tools rotary and feeding movements.

Another object of this invention is to provide a self-contained unit having a tool spindle and so to construct said unit as to permit it to be rigidly secured in any desired position on any suitable form of support, and when so secured to effect rotation and reciprocation of the tool spindle relative to the unit.

A further object is to provide a unit as above described and so to construct said unit as to admit of its being secured to a support in any desired angular relation with respect to one or more similar units, whereby all of said units simultaneously may act on a single work piece.

Still another object of this invention is to provide a unit as above described and to provide fluid pressure actuated means for giving the tool spindle its axial feeding movements.

A still further object of this invention is to provide, in a machine tool, hydraulic means to effect reciprocation of a member and to provide pneumatic means to control the action of said hydraulic means.

Still another object of this invention is to provide a compound machine tool including a plurality of individual self-contained units mounted upon a common support and to provide a single manual control for all of said units.

A further object of the invention is to provide improved pneumatically actuated emergency means for interrupting a cycle of operation and means for automatically retracting the tool spindle to its inoperative position upon actuation of said emergency means.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corersponding parts throughout all the views, of which:—

Figure 1 is a side elevation, partly in section, of a unitarily constructed drill-unit embodying the present invention. Fig. 2 is a section on the line 2—2 of Fig. 1. Fig. 3 is a left end view of Fig. 1 showing the drill-unit supported upon a table and connected to certain power and drain lines later to be referred to. Fig. 4 is a plan view showing a plurality of the drill-units, shown in Fig. 1, arranged arbitrarily on a suitable supporting table and all connected to common fluid pressure lines and all adapted to be controlled by a common control valve located adjacent the operator's normal working position. Figs. 5, 6 and 7, are detail views of the valve which controls the direction and rate of movement of the tool spindle, together with the means for controlling the movement of the valve; the valve being shown in "rapid traverse reverse," "rapid traverse forward," and "slow feed forward" positions, respectively in the three views. Fig. 8 is a transverse section through the control valve taken on the line 8—8 of Fig. 2. Fig. 9 is a section substantially on the line 9—9 of Fig. 2 showing more particularly certain valve retaining members and the automatic and emergency releases therefor. Fig. 10 is a plan of a self-contained drill-unit constructed in accordance with this invention and showing it equipped with a multiple drill-head having a plurality of auxiliary spindles all of which are driven from the main tool spindle shown in Figs. 1 and 2.

Referring more particularly to the drawings, the invention is disclosed as embodied in a unitary structure U comprising a base 1, of box-like formation, within which is rotatably and translatably mounted a spindle S. This base carries all the mechanism required to rotate the spindle and automatically to move the spindle axially in forward and reverse directions at predetermined rates, therefore the unit may be located in any desired position with respect to a work piece or to other similar units, attached to a suitable source of power and be caused automatically to perform machining operations. As shown in Figs. 1, 2 and 3, the base preferably is of rectangular form and provides bearings 2 and 3 for the spindle S. This base also supports, at its upper side, (where it does not preclude close grouping of a plurality of the units) a prime mover which serves to rotate the tool spindle. Preferably the prime mover is an electric motor M which is connected with the spindle through a pinion 4 secured upon the armature shaft a, an intermediate idler gear 5 and a gear 6 mounted on, and having a spline connection with, the spindle. The intermediate gear 5 is journaled upon a stub shaft 7 carried by a gear casing 8, which is secured upon the base 1 and which encloses the gears 4 and 5. From the foreging it will be perceived that the unit includes means to effect rotation of the tool spindle and permits of axial movement thereof.

Axial movement of the tool spindle preferably is effected by means of an inelastic fluid motor, also carried by the base 1, and comprising a cylinder 9 fastened, at one end, to the rear end wall 1ª of the base 1. A piston 10 is slidingly fitted within the cylinder 9 and is connected with one end of a piston-rod 11 which passes through a stuffing-box 12 and has its other end connected with the tool spindle, substantially in axial alignment therewith, in a manner later to be described. Fluid pressure conduits 13 and 14 connect with the cylinder 9 at opposite ends of the piston 10 and serve alternately to admit fluid under pressure into the opposite ends of the cylinder thereby to cause the piston 10, piston-rod 11 and spindle S to be reciprocated.

The rate and direction of flow of fluid into the cylinder 9 and consequently the rate and direction of movement of the tool spindle is controlled by a master valve V supported by the base 1, and comprising a housing 15 formed with a cylindrical bore 16. Within this bore is slidingly fitted a valve piston 17 adapted, by suitable shifting movements, to direct fluid under pressure (entering the cylinder 16 from a suitable fluid pressure line 18) alternately to ports which connect with the conduits 14 and 13 thereby causing the tool spindle alternately to be advanced and retracted. The conduit 14 is connected with the valve cylinder 16 by means of two ports 19 and 20 of unequal capacity. The port 19 (connected with the conduit 14 by means of pipe 19ª) is of relatively large capacity and when connected with the fluid pressure line 18 transmits to the rear end of the cylinder 9, a relatively large amount of fluid at a predetermined pressure. The port 20 (connected with the conduit 14 by means of a pipe 20ª) is of relatively small capacity and when connected with the fluid pressure line to the exclusion of the port 19, transmits to the rear end of the cylinder 9 a relatively small amount of fluid at said predetermined pressure for purposes later to be explained. The capacity of the port 20 preferably is made variable by means of a manually adjustable needle valve 21 as shown in Fig. 8.

To the end that time may not be wasted in the operation of machine tools of this nature it is desirable that means be provided whereby the tool spindle may be given a rapid forward movement to cause the tool (or tools) carried thereby rapidly to be brought from its retracted position substantially into engagement with the work. It is likewise desirable that the spindle then be fed at a rate commensurate with the tooling operation being performed which obviously may not be as fast as the rapid traverse rate. Inasmuch as the retraction of the tool spindle, which takes place after the tooling operation is completed, is an idle movement this too preferably is effected at a rapid rate. It is to be understood, however, that where the tool is to have only a very limited movement to bring it into engagement with the work the rapid forward traverse for the spindle may be dispensed with by omitting from the unit the elements (the pipe 19$^a$ and interference member 35) necessary to produce such rapid traverse. As hereinbefore stated these rates and directions of movement are controlled by actuation of the master valve V. In the present machine this valve is actuated automatically to effect a predetermined cycle of operation of the machine. As shown in Figs. 5, 6 and 7 the valve piston 17 has three operative positions in each of which it effects either a different rate or direction of movement of the tool spindle. In the position shown in Fig. 5 the piston 17, by reason of the reduced diameter of the portion 17$^a$ intermediate its ends, connects the fluid pressure line 18 with the large capacity conduit 13 which in turn connects with the forward end of the cylinder 9, thereby rapidly retracting the spindle, and the tools carried thereby, from the work. This is the position that the valve piston 17 occupies at the end of a working cycle. During the retracting movement of the piston 10 the fluid in the rear end of the cylinder 9 is exhausted through conduits 14 and 19$^a$ and port 19 into the forward end of the cylinder bore 16 of the master valve casing. To permit escape of the fluid from the valve casing the valve piston 17 is formed with a central bore 17$^b$ which permits the exhausted fluid to flow therethrough, thence through a port 22 in the valve casing to a drain pipe 23 which latter returns the fluid to a suitable sump later to be described.

To initiate a new cycle, the valve piston 17 is shifted to its maximum forward position shown in Fig. 6 in which it connects the fluid pressure line 18 with conduits 19$^a$ and 20$^a$ both of which connect with the conduit 14 adapted to deliver fluid under pressure into the rear end of the cylinder 9, thereby effecting a rapid forward movement of the tool spindle. During this forward movement of the piston the fluid in the forward end of the cylinder is exhausted through pipe 13 into the valve cylinder 16 and thence through port 22 and drain pipe 23 to the sump. As the tool spindle reaches a position in which the tool, or tools, carried thereby are almost in contact with the work, the valve piston is shifted to the position shown in Fig. 7 in which it isolates both the conduits 13 and 19$^a$ from the pressure line 18 and effects a flow of fluid from the pressure line only through the restricted pipe 20$^a$. This affords a slow flow of fluid through the pipe 14 into the rear end of the cylinder 9 and therefore effects a slow forward feed of the tool-spindle during the operation of the tool on the work. At the completion of the tooling operation the valve-piston is again moved to the position shown in Fig. 5 and the tool spindle is retracted at a rapid rate.

This invention provides improved means for resetting the valve piston from the position shown in Fig. 5 to the position shown in Fig. 6, thereby to initiate an operative cycle of the machine. It also provides improved means for automatically shifting the valve piston from the position wherein it effects rapid forward traverse of the spindle to the positions wherein it effects successively slow forward feed of the spindle and finally a rapid return movement thereof.

In accordance with this invention the valve piston is reset by pneumatic means and to that end the valve piston is secured upon a rod 24 slidingly mounted within the valve casing 15 and extending therethrough. One end of the rod 24 projects into a cylinder 25 supported by a bracket 26 attached to the end wall 1$^a$ of the base 1, and has fixed upon it a piston 27 slidingly fitted within said cylinder. The opposite end of the rod 24 is slidingly fitted within an aperture formed in an ear 28 projecting laterally from the base 1.

Intermediate the valve cylinder 15 and the ear 28, there is secured to the rod 24 an elongated collar 29 the purpose of which later will be explained. Means is provided for normally tending to move the valve piston 17 and the rod 24 in the direction indicated by the arrow $t$ or in other words toward the position in which the valve effects rapid retraction of the tool spindle. This is preferably effected by means of a coil spring 30 surrounding the rod 24 and interposed between the collar 29 and the lug 28. A similar spring 31 is located within the cylinder 25 and is interposed between the piston 27 and an end wall 25$^a$ of the cylinder. This latter spring assists the spring 30 in shifting the rod 24 and the elements attached thereto. A fluid pressure line 32 is connected with the rear end of the cylinder 25 and provides means for admitting elastic fluid (preferably air) under pressure into the cylinder behind the piston 27 thereby to move the piston 27, rod 24 and master valve piston 17 from the position shown in Fig. 5 to the position shown in Fig. 6. Movement of those parts in that direction is limited by a sleeve 33 located within the cylinder 25 and against which the piston 27 abuts when moved under the influence of the fluid pressure.

Within a bracket 34, fixed to the side of the base 1, are slidingly mounted two L-shaped interference members or detents 35 and 36 urged in one direction by coil springs 37 and 38 respectively fitted within sockets formed in said members and bearing against a plate 39 secured to said bracket. These springs normally tend to move the laterally extending portions 35ª and 36ª of said members toward the rod 24, thereby to place said portions in the path of movement of the collar 29. Therefore as the valve piston 17, rod 24, and collar 29 are moved to the right, from the position shown in Fig. 5 to the position shown in Fig. 6, the portions 35ª and 36ª take the positions shown in the latter figure and thereby prevent return movement of the parts under the influence of the springs 30 and 31 when the fluid pressure on the piston 27 is relieved. Thus it will be perceived that admission of fluid pressure into the cylinder 25 shifts the valve piston to a position wherein it effects forward rapid traverse of the tool spindle. Automatic means is provided for successively moving the interference members out of the path of the collar 29 thereby permitting the springs 30 and 31 to shift the valve piston 17 to positions where it effects slow forward feed of the spindle and rapid return movement thereof.

As hereinbefore stated, the piston rod 11 is connected to the spindle S with their axes substantially in alignment, whereby pressure is transmitted to the tool spindle directly in line with its axis thereby precluding binding action between the spindle and its bearings. This connection is effected by means of a coupling 39 (shown in section in Fig. 2) which comprises a socketed member 40 fixed upon the rod 11 by means of a pin 41. A plate 42 is bolted to the face of the member 40 and is provided with an aperture 43 through which projects the reduced rearward end of the spindle S. Intermediate the plate 42 and a shoulder 44, formed on the tool spindle, is arranged an anti-friction thrust bearing 45 which transmits to the spindle the force exerted by fluid pressure in the rear end of the cylinder 9. A similar thrust bearing 46 is located within a socket 40ª, formed in the member 40, between the plate 42 and a nut 47 threaded upon the extreme rearward end of the tool spindle. This last named thrust bearing and the cooperating plate 42 and nut 47 cause retraction of the spindle when the piston 10 is moved rearwardly by fluid pressure entering the cylinder 9 through pipe 13.

From the foregoing it will be perceived that means has been provided for simultaneously rotating and reciprocating the tool spindle.

Projecting laterally from the member 40 is an arm 48 which extends through an aperture 49 formed in one side wall of the base 1. This arm is provided with upper and lower finished surfaces 48ª and 48ᵇ respectively which slidingly engage the upper and lower walls 49ª and 49ᵇ of said aperture 49. The arm 48 performs dual functions; first it prevents rotation of the piston rod 11 with the spindle S; and second it provides a support 50 for adjustably mounted trip dogs 51 and 52 adapted to depress the interference members 35 and 36 automatically to release the rod 24 and permit it, and the master valve piston, to move under the influence of the springs 30 and 31 as hereinbefore described.

Pre-supposing that the unit has been secured to a suitable table, or other support; that a work-piece has been set up in the proper position in line with a tool carried by the hollow free end of the spindle S; that the motor M is running; and that the spindle has been brought to rest in its retracted position, the operation of the device for a succeeding cycle will be as follows:—First the operator will, by manipulation of a suitable valve, admit fluid under pressure into the cylinder 25 through pipe 32. This will shift the valve piston 17 and the parts movable therewith from the positions shown in Fig. 5 to the position shown in Fig. 6, the portions 35ª and 36ª of the interference members snapping up behind the collar 29 as it is moved out of contact with said portions, thereby preventing return movement of the valve piston. This position of the valve piston effects rapid forward traverse of the tool spindle and just prior to contact of the tool (or tools) with the work, the dog 51 (which has been suitably adjusted) will engage and depress the interference member 35. Depression of this member releases the collar 29 and permits said collar and the parts movable therewith to be moved to the position shown in Fig. 7 wherein the collar abuts against the interference member 36 and the valve piston connects the fluid pressure line 18 with the slow forward feed pipe 20ª. This causes the spindle, and the tool carried thereby, to be fed into the work at a relatively slow rate which feed, combined with the rotation of the tool, causes it to effect its machining operation on the work. The dog 52 is so adjusted on its support 50 that when the tool has been fed into the work the desired distance said dog will depress the interference member 36, as shown in Fig. 5, thereby releasing the collar 29 and permitting the rod 24 and valve piston 17 to be moved to the position shown in said figure, thereby connecting the pressure line 18 with the pipe 13 which admits fluid pressure into the forward end of the cylinder and effecting rapid retraction of the tool spindle, thus completing the cycle of operation.

From the foregoing it will be perceived that after rod 24 and valve piston 17 have been shifted to initiate a cycle, that cycle may be discontinued only by depression of both of the interference members 35 and 36. It sometimes happens in the operation of a machine (such for example as upon the breaking of a tool) that it becomes desirable or necessary to interrupt an operative cycle and to return the tool spindle to its initial and inoperative position. This invention provides improved means for accomplishing that result. Within the bracket 34 there is formed a cylindrical bore 54 within which is fitted a piston 55 (see Fig. 9). This piston rests upon the lateral portions 35$^a$ and 36$^a$ of the interference members when in their uppermost, or valve retaining, positions. A pipe 56 is connected with said cylindrical bore 54 above the piston 55 and, upon actuation of a suitable valve, admits fluid (preferably air) pressure from a suitable source into said cylinder, thereby depressing said piston and causing it to move the interference members out of the path of the collar 29. Upon release of the collar 29 the springs 30 and 31 shift the valve piston to the position wherein it effects rapid retraction of the tool spindles as hereinbefore explained.

To the end that each unit may be utilized simultaneously to drill a plurality of holes, each unit is adapted to be equipped with a multiple spindle head H, as shown in Fig. 10. This head carries a plurality of rotatable auxiliary tool spindles $s$ which may be driven from the main spindle S by any suitable means. One way in which the head H may be supported and the auxiliary spindles $s$ rotated, is illustrated in said Fig. 10. Journaled in the head is a stub shaft 57 which projects rearwardly of the head and is formed with a tapered shank 57$^a$ adapted to fit within the tapered tool-receiving bore of the spindle S. Fixed to the stub-shaft 57 is a drive gear 58 which meshes with and drives pinions 59 fixed upon the auxiliary spindles $s$. To prevent bodily rotation of the head H, and yet to permit it to be moved axially with the main spindle S, guide rods 60 are secured in a standard 61 supported upon the table T and these rods are slidingly fitted within bores extending through bosses 62 provided by the head H. Any suitable means may be provided for causing forward rotation of the auxiliary spindles. For example the motor M may be of the reversible type and therefore when a single tool is fitted to the spindle S the motor may be caused to rotate in one direction and when a multiple head (having auxiliary spindles driven directly from the main spindle) is affixed to the unit, the motor may be caused to rotate in the opposite direction thereby also to rotate the auxiliary spindles forwardly.

As hereinbefore stated this invention proposes combining, in any desired relation, a plurality of the above described units to provide a multiple head machine tool, and to provide manually controlled means for effecting simultaneously actuation of all of said heads. Fig. 4 shows four of said units arranged upon a table or bed T, which may be of any desired shape, but which, in the present instance, is shown as being substantially circular with a depressed portion 63 forming an operative station O for the attendant. When in this position the attendant may arrange the work-piece W on the table in a position common to all the units and observe the action of said units. The units U may be secured to the table T in any desired angular position by any suitable fastening means, such for example as by means of bolts 66 passed through suitable holes in the floor of the base 1 and threaded into suitable tapped holes provided by the table. Should it be desired to elevate one unit above another or to incline it relative to said table this may be accomplished by the insertion, between the table and the base 1, of a suitable spacer member X as shown in dotted lines in Fig. 1.

Hydraulic pressure to effect reciprocation of the pistons 10 may be provided by any suitable means such for example as by a pump P adapted to be driven by a motor $m$. As shown in Fig. 4, this pump and motor may be arranged on the top of a sump R, from which (through pipe 64) the pump may draw inelastic fluid, preferably oil, and exhaust it through a pipe 65, extending around the table to points adjacent each unit and to which the pressure conducting pipes 18 for the individual units are connected. A drain pipe 67 also extends around the table and is connected with the drain pipes 23 of the individual units. The delivery end 67$^x$ of the drain pipe is connected with the sump and returns thereto the fluid exhausted from the cylinder 9. The pump P is provided with the usual pressure relief line 68 which connects with the sump, thereby permitting the pump to exhaust back into the sump when a predetermined pressure had been attained in the pressure line.

To enable the attendant simultaneously to initiate the action of all of the various units there is mounted on the bed T, adjacent the attendant's normal operative position, a suitable control valve C. This valve is connected with a suitable fluid (preferably air) pressure line 69 and is adapted upon one manipulation, to admit fluid pressure into a conduit 70 extending about the table and connected with the pipes 32 which admit fluid pressure into the valve resetting cylinders 25 of the individual units. The valve C is also adapted upon another manipulation to transmit fluid pressure from the pressure line 65 to a conduit 71 also extending about the table and connected with the pipes 56 which transmit fluid pressure into the detent releasing cylinder 54 thereby to effect emergency release and immediate shifting of the valve pistons 17 to retract the spindles from the work. The control valve C may be of any suitable form which may be utilized selectively to connect the main pressure line 69 with the conduits 70 and 71 and also to exhaust the pressure from said conduits when said valve is released. The valve shown herein is a so-called Ross four-way valve manufactured by the Ross Operating Valve Co., Detroit, Michigan, and inasmuch as this valve is a commercial article, the construction of which form no part of the present invention, detailed illustration and description thereof is deemed unnecessary.

To the end that all of the valve pistons 17 may be completely and simultaneously reset substantially instantaneously upon manipulation of the control valve, regardless of temperature conditions, and also to obviate all possibility of clogging, which sometimes occurs where liquid is passed through restricted openings, this invention proposes the use of pneumatic pressure to actuate the valve resetting pistons 27 and also to actuate the pistons 55 which effect emergency release of valve rods 24. It has been found that when liquid under pressure is utilized to reset the valves due to the relatively slow flow of liquid it is necessary that the operator hold the valve C open a materially longer time, than when air is used, in order to insure the complete resetting of all of the valves. It has also been found that when liquid is used the valves are not reset simultaneously, with the result that the various spindles start their advance movement and consequently their retracting movements at different times which is undesirable.

The spindle rotating motors M may be connected with any suitable power line L and preferably an individual switch B will be provided for each unit (as shown in Fig. 3) so that any one or more of a plurality of units may be rendered inoperative without affecting the other units. From the foregoing it will be perceived that there has been provided a self-contained unitary device adapted to be used alone to perform machining operations or to be combined with other similar units in any desired arrangement to provide a multiple head machine tool. In other words the device provided by this invention is adapted to attain all of the objects hereinbefore enumerated.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A machine tool combining a bed having a plane surface; a tool head having a base member adapted to be secured to said bed upon said plane surface in any desired angular position relative thereto; a spindle rotatably and translatably journaled in said tool head; an electric motor supported by said tool head; a driving connection between said motor and said spindle to effect rotation of the latter; a hydraulic motor embodied in said tool head for effecting translation of said spindle relative to said tool head; and an automatically actuated valve mechanism for controlling the flow of fluid to said hydraulic motor to vary the reciprocation of said spindle.

2. A machine tool unit combining a base; a spindle rotatably and translatably mounted in said base; means supported by said base to rotate said spindle; hydraulic means supported by said base to translate said spindle; a valve supported by said base for controlling the action of said hydraulic means; fluid pressure actuated means to move said valve to one position to effect translation of said spindle in one direction; said means comprising a cylinder, a piston movable therein and operatively connected with said valve, a fluid pressure line, a conduit connected with said cylinder, a manually actuable valve connecting said fluid pressure line with said conduit for admitting fluid from the former through the latter into said cylinder, and means controlled by the movement of said spindle to actuate said valve to effect translation of said spindle in the opposite direction.

3. A machine tool unit combining a base; a spindle rotatably and translatably mounted in said base; means supported by said base to rotate said spindle; hydraulic means supported by said base to translate said spindle; a fluid pressure line connected with said hydraulic means; a constant delivery pump supplying fluid to said pressure line; a valve supported by said base for controlling the action of said hydraulic means; means to move said valve to one position to effect translation of said spindle in one direction; means tending to return said valve to its initial position; detent means to restrain said valve against return movement; an arm translatable with said spindle but non-rotatable therewith; and a detent release dog carried by said arm and adapted, during translation of said spindle, to render said detent means ineffective to restrain said valve against return movement.

4. A machine tool unit combining base; a member translatably mounted therein; hydraulic means supported by said base to effect translation of said member; a control valve for said hydraulic means, said valve being adapted in an initial position to effect reverse translation of said member and in another position to effect forward translation thereof; means to shift said valve to the position wherein it effects forward translation of said member; means tending to return said valve to its initial position; detent means to hold said valve in its adjusted position; and manually controlled pneumatic means independent of said hydraulic means and operable at will to cause said detent means to release said valve and permit it to be moved to its initial position to effect retraction of said member.

5. A machine tool combining a bed; a plurality of individual heads secured to said bed, each of said heads comprising a base, a spindle rotatably and translatably journaled therein, an electric motor and operative connections to rotate said spindle, a hydraulic motor to effect translation of said spindle; a fluid pressure line operatively connected to all of said hydraulic motors; individual automatically actuated valves for controlling the flow of fluid to each of said hydraulic motors; fluid pressure actuated means for shifting each of said valves to initiate a cycle; and a single control valve for simultaneously admitting fluid to all of said valve shifting means.

6. A machine tool combining a bed; a plurality of portable individual heads adapted to be secured to said bed in any desired positions, each of said heads being provided with a rotatable and translatable spindle and independent means to rotate and translate said spindle; individual elements on each of said heads to control the direction of translation of the individual spindle; and a main control element for simultaneously actuating all of said individual elements to initiate translation of said spindles.

7. A machine tool unit combining a base; a member translatably mounted therein; hydraulic means, supported by said base, to effect translation of said member; a control valve for said hydraulic means, said valve being adapted in an initial position to effect retratcion of said member and in another position to effect forward translation thereof, pneumatic means independent of said hydraulic means to shift said valve to the position wherein it effects forward translation of said member; retaining means for holding the valve in the last-named position; and automatically actuated mechanical means to release said retaining means and to return the valve to its initial position when the head has been given a forward translation of predetermined extent.

8. A machine tool combining a base; a member translatably mounted theron; hydraulic means to translate said member; a shiftable valve adapted to control the action of said hydraulic means; manually controlled pneumatic means independent of said hydraulic means to shift said valve to one position to initiate an operative cycle, and automatic means actuated in timed relation with the movement of the member to shift said valve to another position to reverse the direction of translation of said member.

9. A machine-tool combining a base; a member translatably mounted thereon; hydraulic means to translate said member; a shiftable valve adapted to control the action of said hydraulic means; pneumatic means to shift said valve to a position in which it effects forward translation of said member; means tending to return said valve to its initial position; retaining means to hold said valve in its shifted position; and manually controled pneumatic means independent of said hydraulic means to render said retaining means ineffective thereby to permit said valve to be returned to its initial position.

10. A machine tool combining a flat bed; a plurality of portable individual heads fixed upon said flat bed, each of said heads comprising a base, a spindle rotatably and translatably journaled therein, means to rotate the spindle, and hydraulically actuated mechanism to translate the spindle; a single fluid pressure system, a pump associated with the bed operatively connected with all of said hydraulic mechanisms and individual automatically actuated controlling devices on each of said heads to regulate the direction of flow of fluid from said system to the individual hydraulic mechanisms to effect forward and reverse feed of each spindle in a predetermined cycle.

11. A machine tool combining a bed; a plurality of individual heads fixed upon said bed, each of said heads comprising a base; a member translatably mounted therein; hydraulic means to effect translation of said member, and a controlling valve for said hydraulic means, a rod connected with said valve; a piston on the rod; a cylinder within which the piston is slidingly fitted; an air pressure line; a conduit operative connected with all of said cylinders behind said pistons; and a control valve connected with said air pressure line and with said conduit and adapted, upon actuation, to admit air under pressure from said pressure line into said conduit and thereby into said cylinders simultaneously to actuate said valves to initiate a cycle in each of said heads.

12. A machine tool combining a bed; a plurality of individual heads fixed upon said bed, each of said heads comprising a base, a member translatably mounted therein, means to effect translation of said member, and a control element for said translating means; pneumatic means to reset all of said control elements to initiate movements of said members; detent means to hold said control elements in their adjusted positions; a pneumatic emergency release for said detent means; and a single manually actuated control valve adapted upon one actuation to effect resetting all of said control elements and upon another actuation to effect emergency release of said detent means.

13. A self-contained portable drill unit adapted to be placed and secured in any desired position on a flat support, combining a base; a drill spindle rotatably and translatably journaled in said base; means carried wholly by said base for rotating said spindle; hydraulically actuating means carried wholly by said base for translating said spindle; and means actuated by the translatory movement of the spindle to vary the action of said hydraulic means, thereby to vary the rate of translation of said spindle.

14. A self-contained portable drill unit adapted to be placed upon and secured in any desired position on a suitable flat support combining a base; spaced bearings provided by said base adjacent one end thereof; a drill spindle rotatably and translatably journaled in said bearings; a gear splined to said spindle intermediate said bearings; an electric motor mounted upon said base above said spindle; a driving connection from said motor to said gear to rotate the latter and said spindle; a reciprocatory hydraulic motor supported by the other end of said base; and a rotatable connection between said hydraulic motor and said spindle.

15. A machine tool combining a flat support; a plurality of self-contained portable drill units secured upon said support in a selected arrangement about a common workpiece; each of said units comprising a base, a tool spindle rotatably and translatably journaled in said base, mechanical means to rotate said spindle and fluid pressure actuated means to translate said spindle; a single fluid pump associated with and forming a part of the machine tool assembly adapted to supply fluid pressure to all of said units; and automatically actuated valve mechanism in each of said drill units individually to control the direction of translation of the drill spindle.

16. A machine tool combining a base; an element translatably mounted thereon; hydraulic means to translate said element; a control valve therefor; means tending to move said valve in one direction; retaining means therefor; pneumatic means for rendering said retaining means ineffective; pneumatic means for moving said valve in the opposite direction; and a single means for controlling both of said pneumatic means.

17. A machine tool combining a flat bed; a plurality of individual heads adapted to be secured to said bed in any desired position, each of said heads being provided with a rotatable and translatable spindle and independent means to rotate and translate said spindle; individual means on each of said heads to control the rate and direction of translation of the individual spindles; and a single master control means for all of said heads.

In witness whereof, I have hereunto subscribed my name.

ROBERT M. GALLOWAY.